US012773867B1

(12) United States Patent
Mckenzie

(10) Patent No.: US 12,773,867 B1
(45) Date of Patent: Oct. 27, 2026

(54) DOCUMENT SIGNATURE DEVICE

(71) Applicant: Qualita Mckenzie, District Heights, MD (US)

(72) Inventor: Qualita Mckenzie, District Heights, MD (US)

(*) Notice: Subject to any disclaimer, the term of this patent is extended or adjusted under 35 U.S.C. 154(b) by 133 days.

(21) Appl. No.: 18/887,120

(22) Filed: Sep. 17, 2024

(51) Int. Cl.
*B41M 3/14* (2006.01)
*B42D 25/318* (2014.01)
*G09B 21/00* (2006.01)

(52) U.S. Cl.
CPC ............. *B41M 3/14* (2013.01); *B42D 25/318* (2014.10); *G09B 21/002* (2013.01)

(58) Field of Classification Search
CPC ...... B41M 3/14; B42D 25/318; G09B 21/002; G09B 21/00
USPC ........... 283/45, 72, 74, 75; 40/905; 434/112, 434/117
See application file for complete search history.

(56) References Cited

U.S. PATENT DOCUMENTS 972,920 A 10/1910 Riggs
5,337,484 A * 8/1994 Cardon ................. B43L 13/201 33/41.2
D430,891 S 9/2000 Faber
9,132,683 B2 9/2015 Zehetner
D834,088 S 11/2018 Shih
11,038,696 B2 6/2021 Shaked
11,220,124 B2 1/2022 Zindl et al.
2003/0047095 A1 3/2003 Cho
2005/0013926 A1* 1/2005 Rutkowski ............ B05C 5/0216 118/679
2019/0290390 A1* 9/2019 Davies ................... A61B 90/03

FOREIGN PATENT DOCUMENTS

CN 110076785 A * 8/2019 .............. B25J 9/123
CN 217967013 U * 12/2022
WO 2010085828 8/2010

* cited by examiner

*Primary Examiner* — Justin V Lewis
(74) *Attorney, Agent, or Firm* — Kyle A. Fletcher, Esq.

(57) ABSTRACT

The document signature device may include a signature printer, a pen body, a controller circuit, and one or more batteries. The document signature device may be adapted to produce a signature for a visually-impaired or blind user. The signature printer may be placed on top of a signature area of a document and may print the signature on the document responsive to activation by the visually-impaired or blind user or an authorized representative. The controller circuit may move a print head in two dimensions over the document and may activate and deactivate the print head to produce a sequence of markings on the document to reproduce the signature. The pen body may activate the controller circuit to produce the signature and may be adapted to provide the feel of a writing instrument for the visually-impaired or blind user.

19 Claims, 6 Drawing Sheets

DOCUMENT SIGNATURE DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of autopens, signing machines, and plotters, more specifically, a document signature device.

Summary of Invention

The document signature device may comprise a signature printer, a pen body, a controller circuit, and one or more batteries. The document signature device may be adapted to produce a signature for a visually-impaired or blind user. The signature printer may be placed on top of a signature area of a document and may print the signature on the document responsive to activation by the visually-impaired user or an authorized representative. The controller circuit may move a print head in two dimensions over the document and may activate and deactivate the print head to produce a sequence of markings on the document to reproduce the signature. The pen body may activate the controller circuit to produce the signature and may be adapted to provide the feel of a writing instrument for the visually-impaired or blind user.

An object of the invention is to provide a signature printer that may be placed over a signature area of a document to reproduce a signature of a visually-impaired or blind user.

Another object of the invention is to provide a print head, an X-axis shaft, a plurality of Y-axis shafts, an X-axis stepper motor, and at least one Y-axis stepper motor that may be activated and deactivated by a controller to reproduce the signature from signature metadata stored in memory.

A further object of the invention is to provide a pen body comprising an activation control that may initiate the reproduction of the signature.

Yet another object of the invention is to provide a print head comprising an inkjet nozzle, a ballpoint pen tip, a felt tip pen tip, or a gel pen tip.

These together with additional objects, features and advantages of the document signature device will be readily apparent to those of ordinary skill in the art upon reading the following detailed description of the presently preferred, but nonetheless illustrative, embodiments when taken in conjunction with the accompanying drawings.

In this respect, before explaining the current embodiments of the document signature device in detail, it is to be understood that the document signature device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the document signature device.

It is therefore important that the claims be regarded as including such equivalent construction insofar as they do not depart from the spirit and scope of the document signature device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word “or” is intended to be inclusive.

Figure 1:
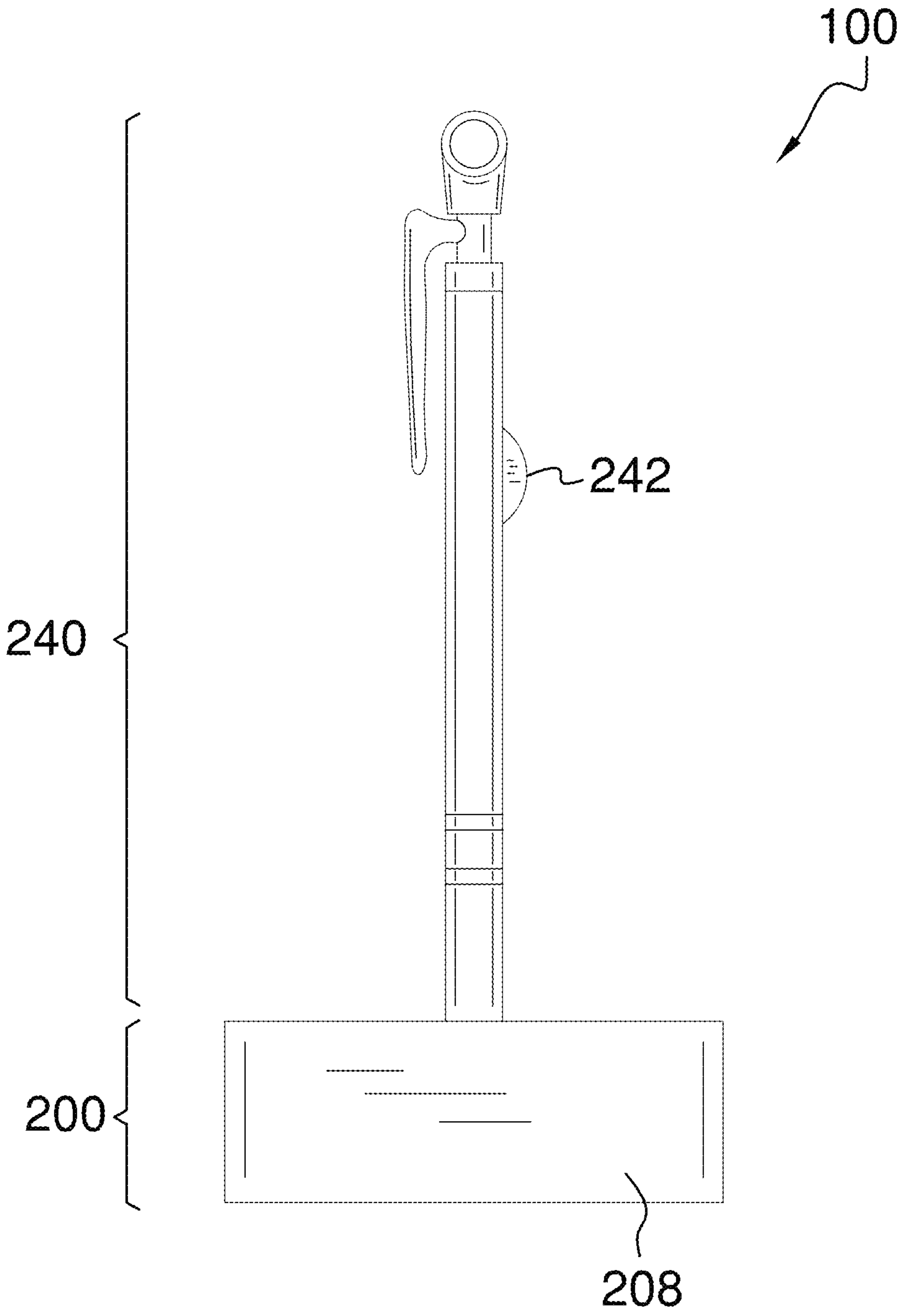
FIG. 1 is a front view of an embodiment of the disclosure.
Figure 2:
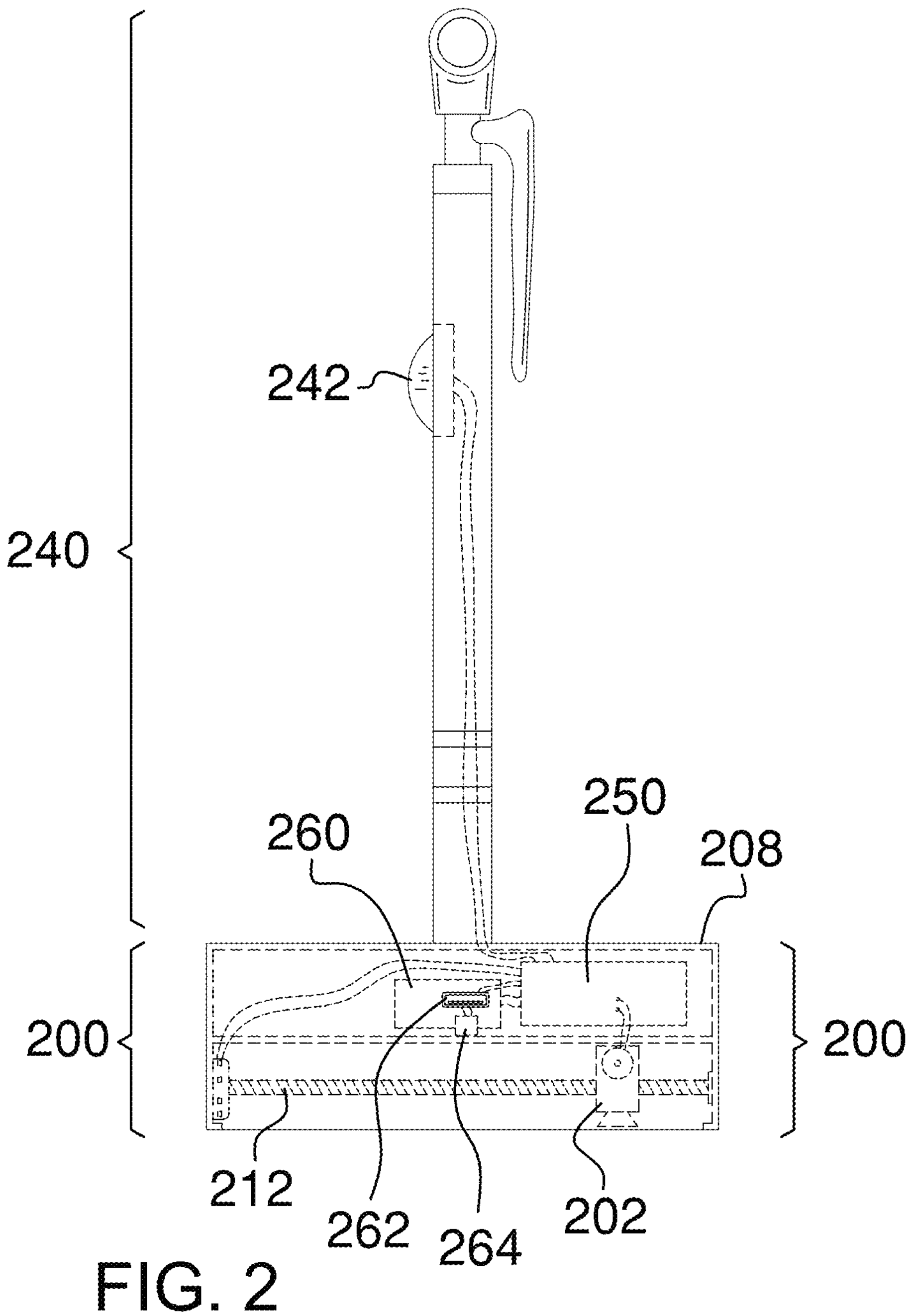
FIG. 2 is a rear view of an embodiment of the disclosure.
Figure 3:
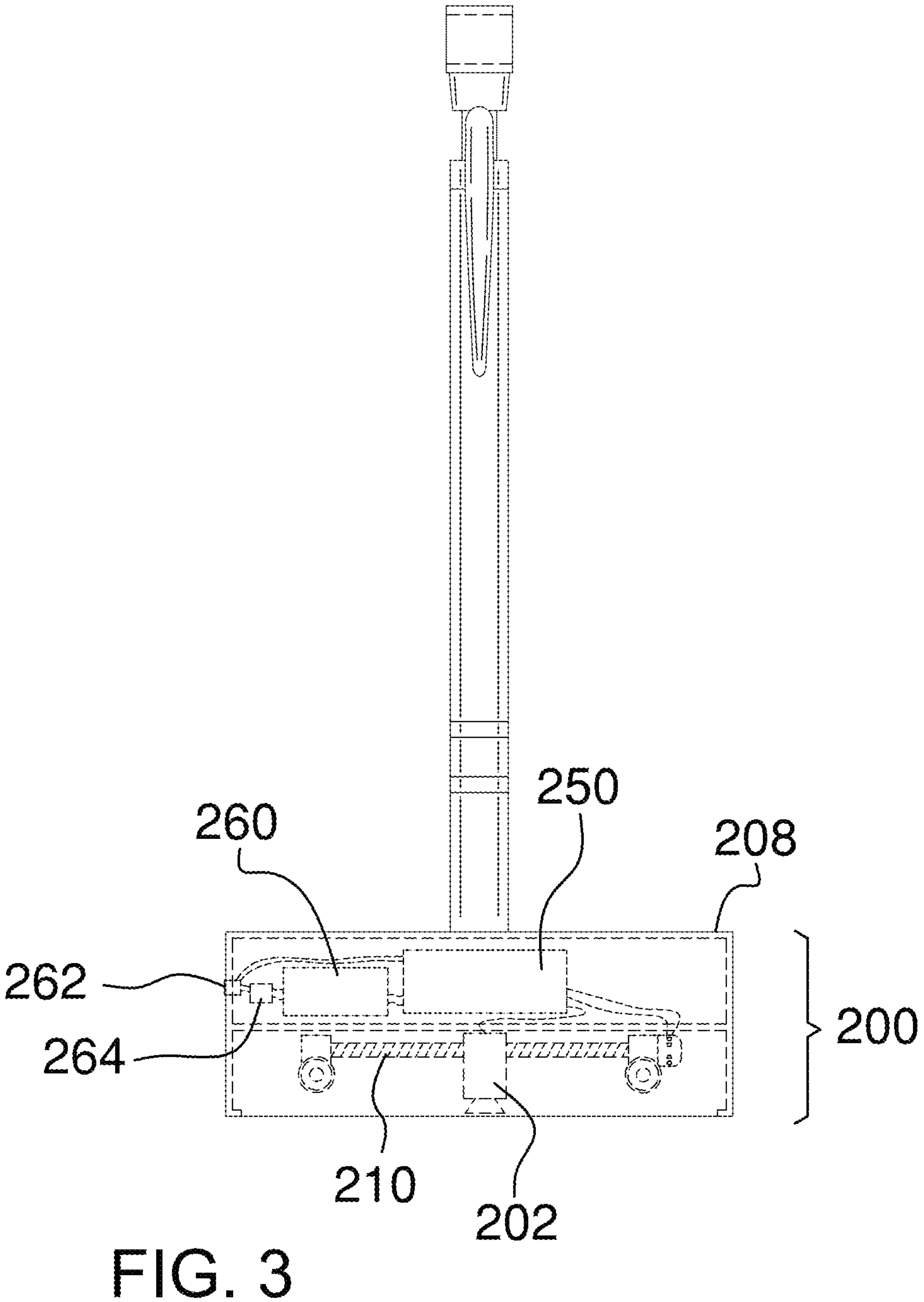
FIG. 3 is a left side view of an embodiment of the disclosure.
Figure 4:
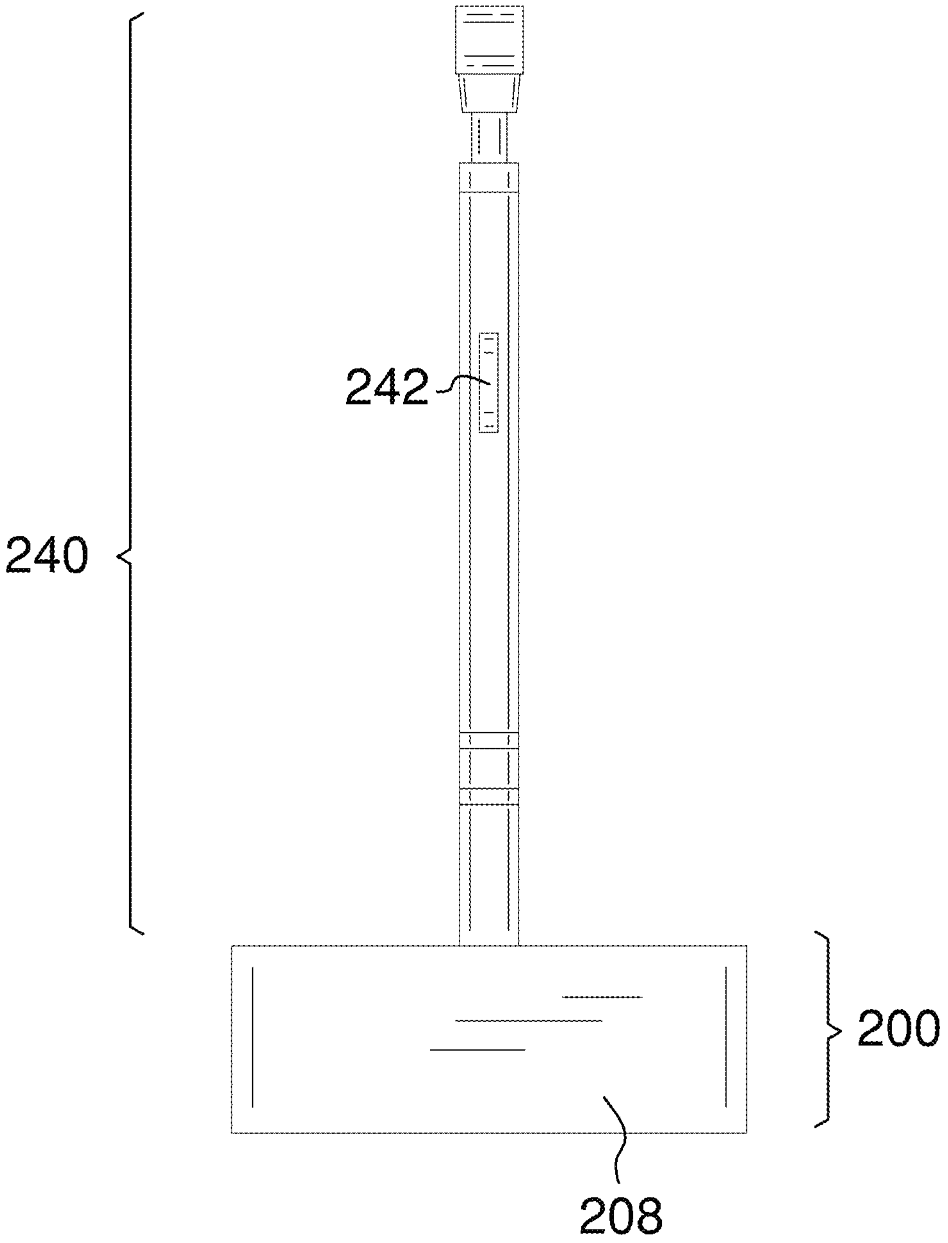
FIG. 4 is a right side view of an embodiment of the disclosure.
Figure 5:
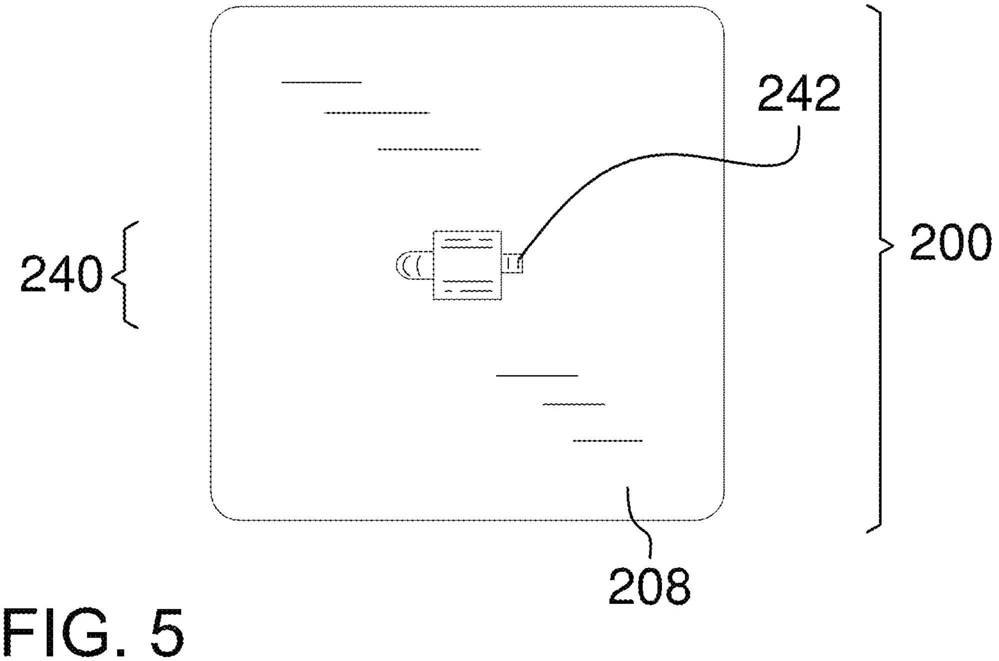
FIG. 5 is a top view of an embodiment of the disclosure.
Figure 6:
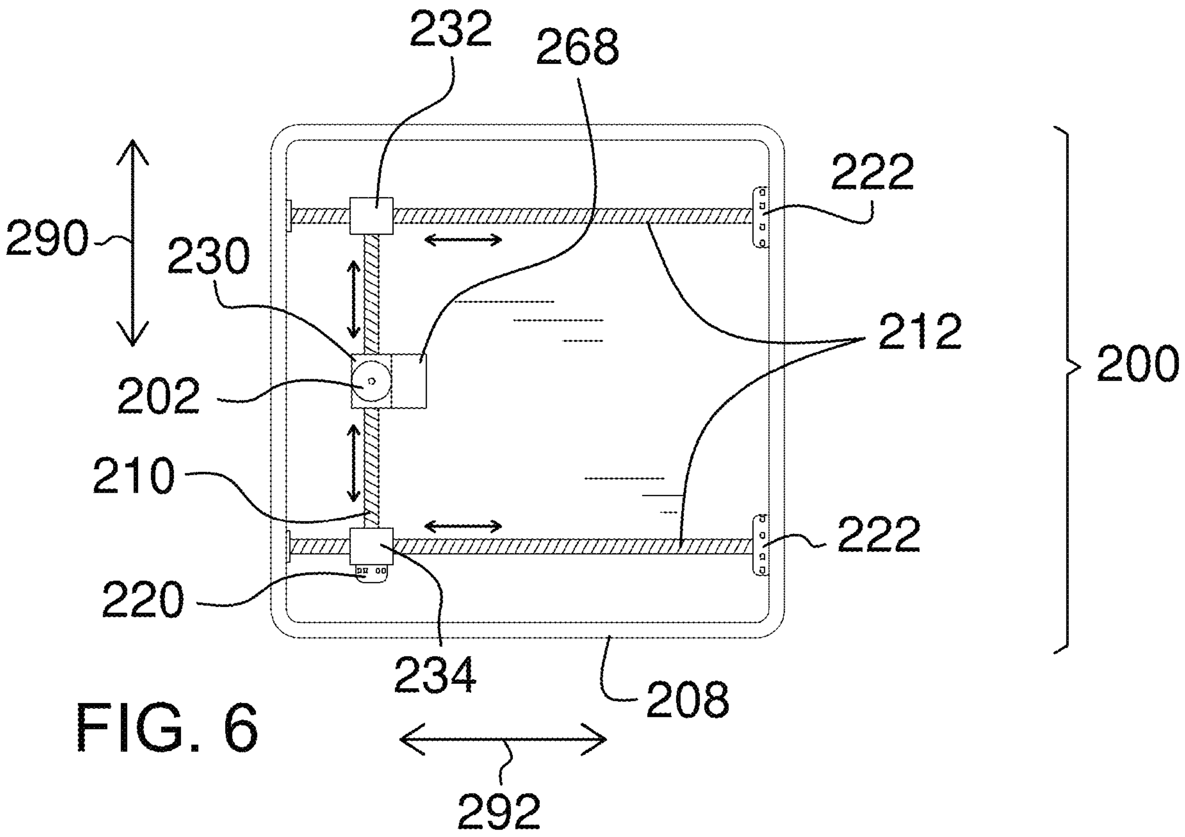
FIG. 6 is a bottom view of an embodiment of the disclosure.
Figure 7:
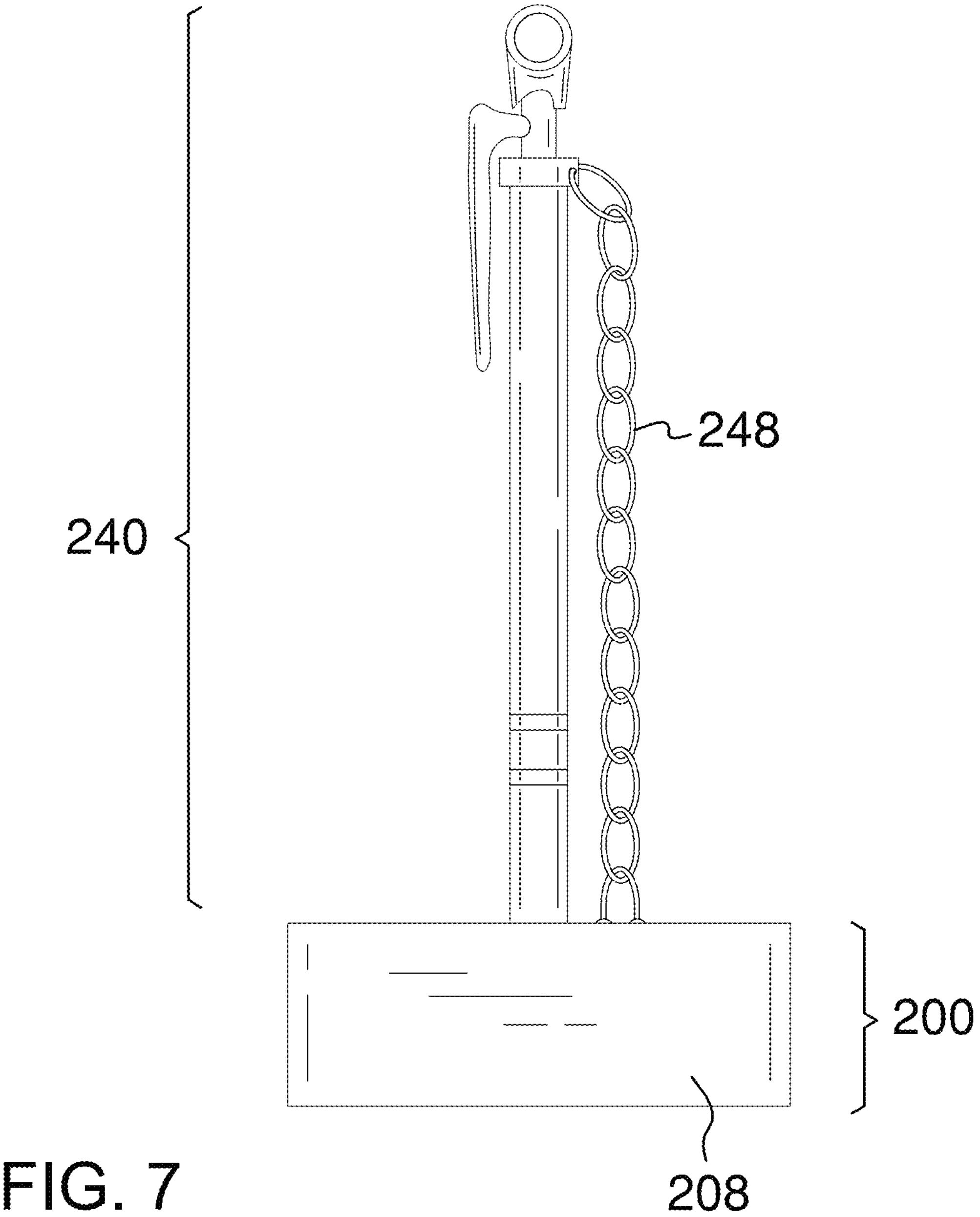
FIG. 7 is a front view of an embodiment of the disclosure, illustrating the chain.

Detailed reference will now be made to a first potential embodiment of the disclosure, which is illustrated in FIGS. 1 through 7.

The document signature device 100 (hereinafter invention) comprises a signature printer 200, a pen body 240, a controller circuit 250, and one or more batteries 260. The invention 100 may be adapted to produce a signature for a visually-impaired or blind user. The signature printer 200 may be placed on top of a signature area of a document and may print the signature on the document responsive to activation by the visually-impaired or blind user or an authorized representative. The controller circuit 250 may move a print head 202 in two dimensions over the document and may activate and deactivate the print head 202 to produce a sequence of markings on the document to reproduce the signature. The pen body 240 may activate the controller circuit 250 to produce the signature and may be adapted to provide the feel of a writing instrument for the visually-impaired or blind user.

The signature printer 200 may comprise the print head 202, an X-axis shaft 210, a plurality of Y-axis shafts 212, an X-axis stepper motor 220, one or more Y-axis stepper motors 222, a print head carrier 230, a first X-shaft carrier 232, and a second X-shaft carrier 234. The print head 202 may selectively make the markings on the document as the print head 202 is moved over the document by rotation of the X-axis shaft 210 and the plurality of Y-axis shafts 212.

The print head 202 may be operable to make the markings beneath the print head 202 in response to being activated by the controller circuit 250. The print head 202 may be deactivated to stop making the markings. The print head 202 may be movably coupled to the X-axis shaft 210 via the print head carrier 230. The X-axis shaft 210 may be movably coupled to the plurality of Y-axis shafts 212 via the first X-shaft carrier 232 and the second X-shaft carrier 234. An individual shaft selected from the X-axis shaft 210 and the plurality of Y-axis shafts 212 may be threaded such that an individual carrier selected from the print head carrier 230, the first X-shaft carrier 232, and the second X-shaft carrier 234 may move along the individual shaft as the individual shaft rotates. The individual carrier may comprise a shaft aperture that may be threaded complementary to the thread of the individual shaft such that rotation of the individual shaft moves the individual carrier.

The X-axis stepper motor 220 may move the print head carrier 230 in an X direction 290. The X-axis stepper motor 220 may be coupled to the X-axis shaft 210 such that the X-axis stepper motor 220 may rotate the X-axis shaft 210 responsive to being energized. The X-axis stepper motor 220 may be mounted on the first X-shaft carrier 232 or the second X-shaft carrier 234 such that the X-axis stepper motor 220 may move with the X-axis shaft 210.

The one or more Y-axis stepper motors 222 may move the X-axis shaft 210 and the print head carrier 230 in a Y direction 292. The one or more Y-axis stepper motors 222 may be coupled to the plurality of Y-axis shafts 212 such that the one or more Y-axis stepper motors 222 may rotate the plurality of Y-axis shafts 212 responsive to being energized. The one or more Y-axis stepper motors 222 may be mounted on a printer housing 208 at one end of the plurality of Y-axis shafts 212. The one or more Y-axis stepper motors 222 may be energized by the controller circuit 250 using the same polarity at both of the motors such that the one or more Y-axis stepper motors 222 rotate the plurality of Y-axis shafts 212 in the same direction and at the same speed.

The printer housing 208 may be an enclosure for the print head 202, the X-axis shaft 210, the plurality of Y-axis shafts 212, the X-axis stepper motor 220, the one or more Y-axis stepper motors 222. The printer housing 208 may comprise an open bottom such that the print head 202 may access the document for the purpose of making the markings.

The pen body 240 may project upwards from the top center of the printer housing 208. The pen body 240 may be adapted to resemble the writing instrument such that the visually-impaired user may psychologically feel that the writing instrument was used to sign the document. The pen body 240 may comprise an activation control 242 that may initiate the signing the of the document.

The activation control 242 may be an electrical switch that is electrically coupled to the controller circuit 250 such that the controller circuit 250 may sense activation of the activation control 242. In some embodiments, the electrical switch may be a pushbutton switch.

In some embodiments, the pen body 240 may comprise a chain 248 that may be coupled to the pen body 240 at the top of the pen body 240. The chain 248 may be operable to detachably couple the invention 100 to a tether and/or may be coupled to the activation control 242 such that pulling on the chain 248 may activate the signature printer 200.

The controller circuit 250 may control the operation of the invention 100. The controller circuit 250 may monitor the activation control 242, may activate and deactivate the print head 202, and may energize and de-energize the X-axis stepper motor 220 and the one or more Y-axis stepper motors 222. The controller circuit 250 may comprise at least one memory component. At least a portion of the at least one memory component may be non-volatile memory which may store metadata that describes the signature. Responsive to input from the activation control 242, the controller circuit 250 may move the print head 202 in the X direction 290 and in the Y direction 292 and may selectively energize and de-energize the print head 202 to reproduce the signature as described by the metadata. As non-limiting examples, the metadata may store the signature in bitmap or vector format.

The one or more batteries 260 may comprise one or more energy-storage devices. The one or more batteries 260 may be a source of electrical energy to operate the print head 202, the X-axis stepper motor 220, the one or more Y-axis stepper motors 222, and the controller circuit 250. The one or more batteries 260 may be rechargeable via a recharging port 262 that may be accessible on the exterior of the printer housing 208. In some embodiments, a power circuit 264 may condition the incoming power and may monitor and control the charging of the one or more batteries 260.

The print head 202 may be fluidly coupled to an ink reservoir 268 from which the print head 202 may be supplied with ink used to reproduce the signature. The ink reservoir 268 may be replaceable and/or refillable.

In some embodiments, the print head 202 may be an inkjet printer with an inkjet nozzle located on the bottom of the print head 202. The print head 202 may produce the markings by spraying droplets of the ink from the inkjet nozzle onto the document.

In some embodiments, the print head 202 may comprise a ballpoint pen, a felt tip pen, or a gel pen having a pen tip positioned on the bottom of the print head 202. The print head 202 may comprise a Z-axis mechanism to remove the pen tip from the document by lifting the pen tip or by pivoting the pen tip. The Z-axis mechanism may press the pen tip against the document as directed by the controller circuit 250.

In use, a signature of a visually-impaired user may be digitized to create metadata. The metadata may be downloaded to the non-volatile portion of the at least one memory component of the controller circuit 250 such that the metadata is available within the signature printer 200 at all times. In some embodiments, it may be possible to load the metadata into the at least one memory component in the field. As a non-limiting example, the recharging port 262 may be a USB port that may provide power to the invention 100 and may enable communication between the controller circuit 250 and an external device that may download the metadata. The signature may be reproduced by placing the signature printer 200 over the signature area and activating the signature printer 200 using the activation control 242. As non-limiting examples, the signature area may be a signature line or a signature box. Responsive to being activated, the controller circuit 250 may move the print head 202 in the X direction 290 and the Y direction 292 and may activate and deactivate the print head 202 to produce a sequence of the markings on the document that reproduce the signature.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface or object. Aperture may be synonymous with hole, slit, crack, gap, slot, or opening.

Throughout this document the terms "battery", "battery pack", and "batteries" may be used interchangeably to refer to one or more wet or dry cells or batteries of cells in which chemical energy is converted into electricity and used as a source of DC power. References to recharging or replacing 23 batteries may refer to recharging or replacing individual cells, individual batteries of cells, or a package of multiple battery cells as is appropriate for any given battery technology that may be used. The battery may require electrical contacts which may not be illustrated in the figures.

As used herein, "complement" or "complementary" may refer to a compatibility between threaded parts such that the gender, handedness, form, angle, pitch, diameter, and thread depth of both threads are compatible for the parts to mate by screwing the threads together. "Complement" and "complementary" may also be used to describe compatibility between geared parts and/or combinations of geared parts and threaded parts. As a non-limiting example, the worm screw and worm gear of a worm drive mechanism may be said to be complementary if the worm screw meshes with the worm gear and the worm screw is operable to turn the worm gear when the worm screw rotates.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw. In some embodiments, a control may alter an electrical property of a circuit such as resistance, inductance, or capacitance.

As used herein, the words "couple", "couples", "coupled" or "coupling", may refer to connecting, either directly or indirectly, and does not necessarily imply a mechanical connection.

As used herein, "energize" and/or "energization" may refer to the application of an electrical potential to a system or subsystem. "De-energize" and/or "de-energization" may refer to the removal of the electrical potential.

As used in this disclosure, the word "exterior" may be used as a relational term that implies that an object is not located or contained within the boundary of a structure or a space.

As used in this disclosure, a "housing" may be a rigid or semi-rigid casing that encloses and protects one or more devices.

As used in this disclosure, the term "load" may refer to an object upon which a force is acting or which is otherwise absorbing energy in some fashion. As non-limiting examples, a mass that is being moved a distance or an electrical circuit element that draws energy. The term load may also be used to refer to a force that is applied to a stationary structure.

As used in this disclosure, a "motor" may refer to a device that transforms energy from an external power source into mechanical energy.

As used herein, the words "printed", "marked", and "marking" may refer to a mark that has been made on an object. The process of making the mark may involve printing, lithography, thermal transfer, painting, embossing, molding, burning, punching, silk-screening, drawing, etching, engraving, stenciling, stamping, spraying of pigments, or other processes which result in the controlled change of coloration and/or shape of a surface.

As used in this disclosure, a "printer" may be a device that receives text or graphical output from a computer and transfers the information to paper.

As used herein, "reservoir" may refer to a container or containment system that is configured to store a liquid, gas, or gel.

As used in this disclosure, a "switch" may be an electrical device that starts and stops the flow of electricity through an electric circuit by completing or interrupting an electric circuit. The act of completing or interrupting the electrical circuit may be called actuation. Completing or interrupting an electric circuit with a switch is often referred to as closing or opening a switch, respectively. Completing or interrupting an electric circuit is also referred to as making or breaking the circuit, respectively.

As used in this disclosure, "USB" may be an acronym for Universal Serial Bus which refer to one or more industry standards that defines the cables, the connectors, the communication protocols, and the distribution of power required for interconnections between electronic devices. The USB standards define several connectors including, but not limited to, USB-A, USB-B, USB-C, mini-USB, and micro USB connectors.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A document signature device comprising:

a signature printer, a pen body, a controller circuit, and one or more batteries;

wherein the document signature device is adapted to produce a signature for a visually-impaired user;

wherein the signature printer is placed on top of a signature area of a document and prints the signature on the document responsive to activation by the visually-impaired user;

wherein the controller circuit moves a print head in two dimensions over the document and activates and deactivates the print head to produce a sequence of markings on the document to reproduce the signature;

wherein the pen body activates the controller circuit to produce the signature and is adapted to provide a feel of a writing instrument for the visually-impaired user.

2. The document signature device according to claim 1 wherein the signature printer comprises the print head, an X-axis shaft, a plurality of Y-axis shafts, an X-axis stepper motor, one or more Y-axis stepper motors, a print head carrier, a first X-shaft carrier, and a second X-shaft carrier;

wherein the print head selectively makes the markings on the document as the print head is moved over the document by rotation of the X-axis shaft and the plurality of Y-axis shafts.

3. The document signature device according to claim 2 wherein the print head is operable to make the markings beneath the print head in response to being activated by the controller circuit;

wherein the print head is deactivated to stop making the markings;

wherein the print head is movably coupled to the X-axis shaft via the print head carrier;

wherein the X-axis shaft is movably coupled to the plurality of Y-axis shafts via the first X-shaft carrier and the second X-shaft carrier;

wherein an individual shaft selected from the X-axis shaft and the plurality of Y-axis shafts is threaded such that an individual carrier selected from the print head carrier, the first X-shaft carrier, and the second X-shaft carrier moves along the individual shaft as the individual shaft rotates.

4. The document signature device according to claim 3 wherein the individual carrier comprises a shaft aperture that is threaded complementary to the thread of the individual shaft such that rotation of the individual shaft moves the individual carrier.

5. The document signature device according to claim 4 wherein the X-axis stepper motor moves the print head carrier in an X direction;

wherein the X-axis stepper motor is coupled to the X-axis shaft such that the X-axis stepper motor rotates the X-axis shaft responsive to being energized;

wherein the X-axis stepper motor is mounted on the first X-shaft carrier or the second X-shaft carrier such that the X-axis stepper motor moves with the X-axis shaft.

6. The document signature device according to claim 5 wherein the one or more Y-axis stepper motors move the X-axis shaft and the print head carrier in a Y direction;

wherein the one or more Y-axis stepper motors are coupled to the plurality of Y-axis shafts such that the one or more Y-axis stepper motors rotate the plurality of Y-axis shafts responsive to being energized;

wherein the one or more Y-axis stepper motors are mounted on a printer housing at one end of the plurality of Y-axis shafts.

7. The document signature device according to claim 6 wherein the one or more Y-axis stepper motors are energized by the controller circuit such that the one or more Y-axis stepper motors rotate the plurality of Y-axis shafts in a same direction and at a same speed.

8. The document signature device according to claim 7 wherein the printer housing is an enclosure for the print head, the X-axis shaft, the plurality of Y-axis shafts, the X-axis stepper motor, the one or more Y-axis stepper motors;

wherein the printer housing comprises an open bottom such that the print head accesses the document for a purpose of making the markings.

9. The document signature device according to claim 8 wherein the pen body projects upwards from a top center of the printer housing;

wherein the pen body is adapted to resemble the writing instrument such that the visually-impaired user psychologically feels that the writing instrument was used to sign the document;

wherein the pen body comprises an activation control that initiates the signing of the document.

10. The document signature device according to claim 9 wherein the activation control is an electrical switch that is electrically coupled to the controller circuit such that the controller circuit senses activation of the activation control.

11. The document signature device according to claim 10 wherein the electrical switch is a pushbutton switch.

12. The document signature device according to claim 10 wherein the pen body comprises a chain that is coupled to the pen body at a top of the pen body;

wherein the chain is operable to detachably couple the document signature device to a tether and/or the chain is coupled to the activation control such that pulling on the chain activates the signature printer.

13. The document signature device according to claim 10 wherein the controller circuit controls an operation of the document signature device;

wherein the controller circuit monitors the activation control, activates and deactivates the print head, and energizes and de-energizes the X-axis stepper motor and the one or more Y-axis stepper motors;

wherein the controller circuit comprises at least one memory component;

wherein at least a portion of the at least one memory component is non-volatile memory which stores metadata that describes the signature;

wherein responsive to input from the activation control, the controller circuit moves the print head in the X direction and in the Y direction and selectively energizes and de-energizes the print head to reproduce the signature as described by the metadata.

14. The document signature device according to claim 13 wherein the metadata stores the signature in bitmap or vector format.

15. The document signature device according to claim 14 wherein the one or more batteries comprise one or more energy-storage devices;

wherein the one or more batteries are a source of electrical energy to operate the print head, the X-axis stepper motor, the one or more Y-axis stepper motors, and the controller circuit;

wherein the one or more batteries are rechargeable via a recharging port that is accessible on an exterior of the printer housing.

16. The document signature device according to claim 15 wherein a power circuit conditions an incoming power and monitors and controls a charging of the one or more batteries.

17. The document signature device according to claim 15 wherein the print head is fluidly coupled to an ink reservoir from which the print head is supplied with ink used to reproduce the signature;

wherein the ink reservoir is replaceable and/or refillable.

18. The document signature device according to claim 17 wherein the print head is an inkjet printer with an inkjet nozzle located on a bottom of the print head;

wherein the print head produces the markings by spraying droplets of the ink from the inkjet nozzle onto the document.

19. The document signature device according to claim 17 wherein the print head comprises a ballpoint pen, a felt tip pen, or a gel pen having a pen tip positioned on a bottom of the print head;

wherein the print head comprises a Z-axis mechanism to remove the pen tip from the document by lifting the pen tip or by pivoting the pen tip;

wherein the Z-axis mechanism presses the pen tip against the document as directed by the controller circuit.

* * * * *